Aug. 28, 1945.  E. C. STINSON ET AL  2,383,923
PORTABLE FORMER
Filed Aug. 9, 1943  2 Sheets-Sheet 2

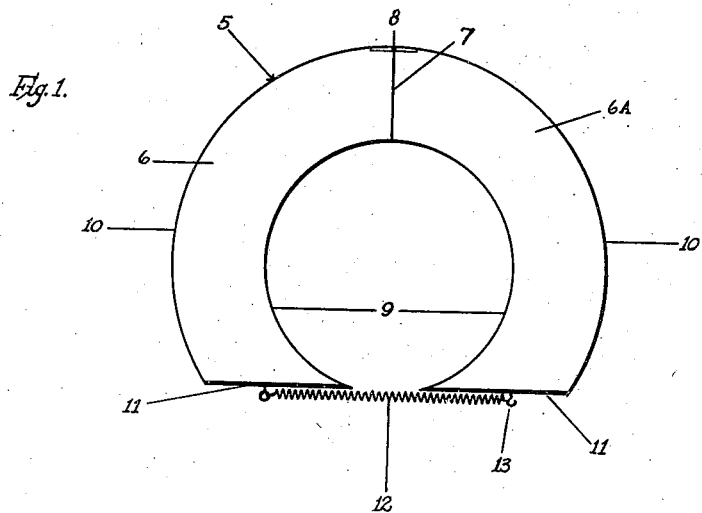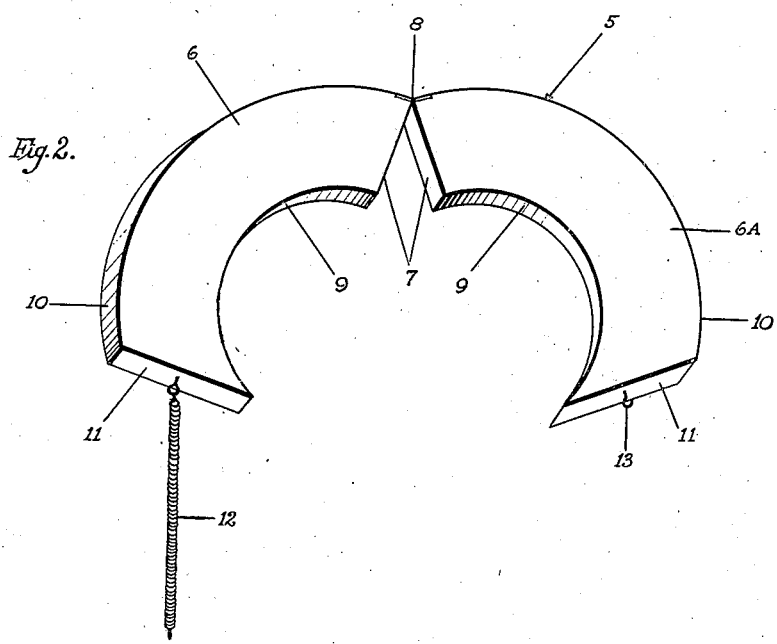

INVENTORS
EVERSON C. STINSON
BY   EARL D. HALL
ATTORNEYS

Patented Aug. 28, 1945

2,383,923

UNITED STATES PATENT OFFICE 2,383,923

PORTABLE FORMER

Everson C. Stinson, Woolwich, and Earl D. Hall, Windham, Maine

Application August 9, 1943, Serial No. 497,942

4 Claims. (Cl. 25—118)

Our present invention relates to formers for use in lagging pipes, elbows, valves, and the like.

The application of lagging to elbows and to other pipe sections including valves or the like is difficult. In lagging pipes, it is necessary to provide sufficient clearance between the lagging and the flanges, through which adjacent pipe sections are bolted together, to permit the bolts to be tightened or removed without injury to the lagging. Such uncovered spaces are subsequently closed by portable covers which the lagging must be shaped to fit. In the case of a valve, the insulation is completed by a portable bonnet cover and the lagging on the valve must be formed to provide a seat for such cover if the insulation is to be effective.

A usual practice in lagging is to wire asbestos felt or the like to the body to be insulated and then to coat the felt with a suitable cement which is shaped to provide clearance required for the flanged joints and the desired fit of the portable covers needed to complete the insulation.

Considerable time and skill is required to lag valves in accordance with such practices and a substantial waste of material results. As a consequence, lagging has always been costly. Present practices are further objectionable because even the most skillful workman is not able to secure uniform and satisfactorily appearing results. As a result, the insulation is not wholly effective and where the desired clearances are not established, service of the pipe frequently results in damage to the lagging.

In accordance with our invention, we provide a pair of formers each comprising sections adapted to be assembled about the pipe section adjacent its flanges to define between them the surface to be lagged and to provide a guide for the workman as to the depth and shape of the lagging. The inner edges of the sections are shaped to engage with the periphery of the pipe throughout their length while the outer edges are shaped to provide a guide for the workman of the depth and shape wanted for the lagging to ensure the proper fit of the portable covers and to enable the finished lagging to have the force of the body that it covers.

Preferably, the sections of our formers are hinged at one end and taper inwardly at their other ends so that the tapered ends establish, when closed about the body to be lagged, a surface substantially tangential to the periphery of the pipe. When the formers are closed about a valve with such surfaces in a common plane, a portable bonnet seat may be accurately formed and when closed about an elbow with such surface of each former disposed adjacent each other, the formers do not interfere with one another. The tapered ends of our formers are preferably detachably connected to permit them to be quickly and easily closed about the body or removed therefrom when the lagging has set.

Our invention not only makes possible a substantial saving in time in lagging and requires less skill since the formers provide an accurate guide for the workman, but also permits a saving of lagging material. These factors, together with the ease of making the lagging fit the portable covers, be of improved appearance, and have the essential clearance with reference to the flanges, make our invention of real importance wherever lagging is required.

In the accompanying drawings, we have shown an illustrative embodiment of our invention from which its novel features and advantages will be readily apparent. In the drawings:

Fig. 1 is a view of a former in accordance with our invention in its closed position.

Fig. 2 shows, in perspective, the former of Fig. 1 in its open position.

Figure 3:
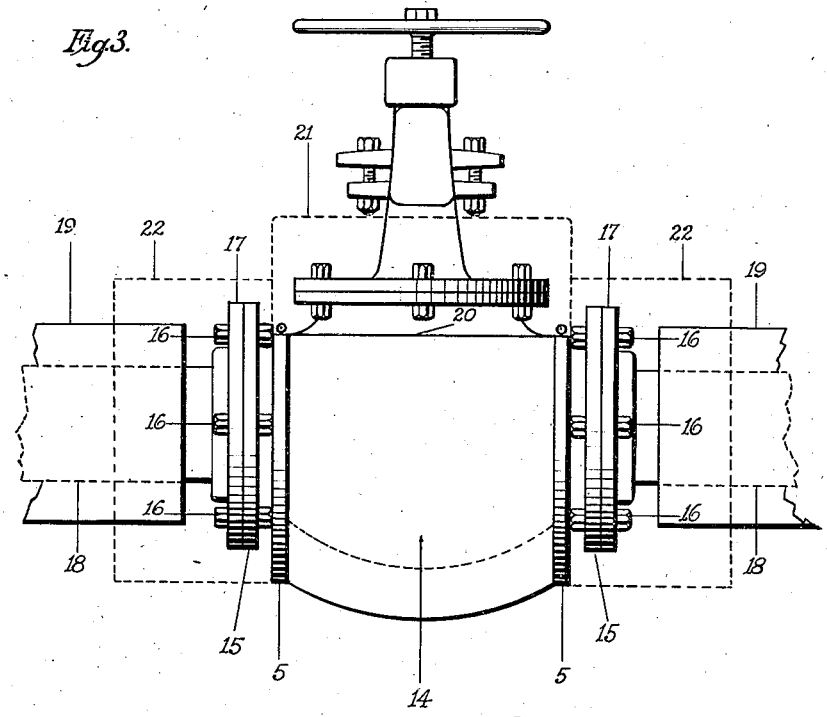
Fig. 3 shows a pair of our formers clamped to a valve to facilitate the accurate application of the lagging thereto.

We have generally indicated at 5 formers in accordance with our invention. The formers 5 each comprise a pair of substantially identical sections 6 and 6A of such suitable material as wood, metal, or plastic. One end 7 of each of the sections 6 and 6A is formed to butt against the corresponding end 7 of the other section and, preferably, these ends are interconnected by a hinge 8 to facilitate their disposition around the pipe to be lagged.

The inner edges 9 of the sections 6 and 6A are arcuate so that when the ends 7 are in abutting relation, the edges 9 contact the periphery of the pipe throughout their length. The distance between the inner edge 9 and the outer edge 10 of the sections 6 and 6A is dependent on the thickness of lagging wanted and the contour of the outer edges 10 is determined by the shape of the lagging necessary to secure the desired fit of the portable covers.

Preferably, we form the sections 6 and 6A so that their outer edges taper inwardly towards each other at their unhinged ends as at 11. In practice, the inner edges 9 of the former sections define an arc of slightly less than 180° and the portions 11 of the outer edges 10 are so inwardly tapered that they are in alinement when a former 5 is closed about the pipe (see Fig. 1).

We provide means for detachably clamping the sections 6 and 6^A together when closed about the pipe. Such means may conveniently comprise a spring 12 carried by the portion 11 of one former section to be connected to a hook 13 carried by the portion 11 of the other former section so that a former 5 may be easily clamped tightly to the pipe or be easily removed therefrom by connecting or disconnecting the spring 12 from the hook 13.

In Fig. 3, we have shown a pair of formers 5 clamped to a valve 14, the flanges 15 of which are bolted as at 16 to the flanges 17 of adjacent pipe sections 18. The pipe sections 18 have lagging 19 applied thereto which is spaced from the flanges 17 to permit the bolts to be removed without injury to the lagging after their nuts have been removed therefrom. Preferably, the sections 6 and 6^A are of sufficient thickness so that they may be positioned against the bolts and when removed leave a desired clearance sufficient to permit access to the nuts to permit them to be removed or tightened without injury to the lagging.

As shown in Fig. 3, the formers 5 are positioned so that their surfaces 11 are in the same plane so that when the lagging is applied to the valve to a depth determined by the formers and by the shape of the valve, a flat seat 20 is established for the portable bonnet cover 21 while the remainder of the periphery of each former serves to ensure the desired fit of the portable flange covers indicated at 22.

Figure 4:
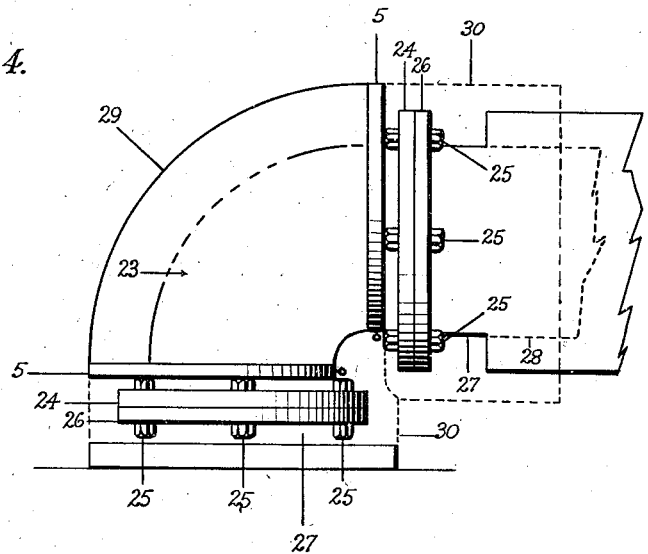
Fig. 4 is a similar view of our formers clamped to an elbow.

In Fig. 4, we have shown our formers 5 clamped to an elbow 23 having flanges 24 bolted as at 25 to the flanges 26 of the pipe sections 27. The lagging 28 on the pipe sections 27 is spaced from the flanges to permit the bolts to be removed without injury to the lagging.

The formers 5 are clamped to the elbow 23 and as the surfaces 11 of each former are substantially tangential to the periphery of the pipe, and as the alined surfaces 11 of each former are disposed adjacent the corresponding surfaces of the other former, the formers 5 do not interfere with each other. With the formers attached as shown in Fig. 4, the lagging 29 may be quickly and accurately applied to establish the desired form as determined by formers and the elbow so that the desired fit of the flange covers indicated at 22 may be readily effected.

In lagging, the body between the pairs of formers 5 are conventionally first wrapped with a fireproof asbestos felt, such as "Amosite" of the desired thickness. A mixture of magnesia and Portland cement is then applied over the felt to establish the wanted shape as determined by the formers 5 and the valve, elbow, or other body. After the mixture has set, the formers 5 are removed and the portable covers 30 are added to complete the insulation.

As the formers 5 permit the lagging to be quickly applied, even if the felting consists of fragments, hold the cement against working towards the flanged joints, and give the workman a guide to permit him to quickly and accurately shape the lagging, our invention permits the lagging to be done with a substantial saving in time and materials and ensures correct appearance, the required clearance relative to the flanged joints, and an accurate fit of portable covers.

What we therefore claim and desire to secure by Letters Patent is:

1. A former for use in lagging pipes, valves, elbows, and the like intermediate flanged joints to receive covers, said former comprising a pair of substantially identical sections, the inner edge of each of which is arcuate and the outer edge of which defines the thickness of the lagging, one end of each of said sections being adapted to butt against the corresponding end of the other section, the other end of each section tapering towards said inner edge, means interconnecting said sections to permit said sections to be clamped to said pipe in desired relation to a flanged joint to establish said former, the inside diameter of said former being substantially equal to the outside diameter of said pipe and the outside diameter of said former being such as to define with the surface of said pipe the thickness of the lagging to be applied between pairs of formers clamped thereto, said tapered ends establishing a flat face so that the lagging may be formed relative thereto to provide a flat cover receiving seat.

2. The former of claim 1 in which the means interconnecting the sections comprise a hinge connecting the first named section ends, and resilient means detachably interconnecting the tapered ends of the sections.

3. The former of claim 1 in which the outer and inner edges of the sections define arcs of less than 180°.

4. A former for lagging pipes, valves, elbows, and the like intermediate flanged joints to receive covers, said former comprising a pair of substantially identical sections, each of which has concentric outer and inner edges, one end of each of said sections being adapted to butt against the corresponding end of the other section, the other end of each of said sections being tapered to be substantially in alinement when said first named ends are abutted, means interconnecting both ends of said sections to permit said former to be clamped to said pipe in desired relation to a flanged joint to establish said former with said tapered ends establishing a flat face, the inside diameter of said former being substantially equal to the outside diameter of said pipe and the outside diameter of said former being such as to define with the surface of said pipe the thickness of the lagging to be applied between pairs of formers clamped thereto and disposed relative to each other to bring said flat faces into a position to define the disposition of the lagging as required intermediate said joints and by said covers.

EVERSON C. STINSON.
EARL D. HALL.